(12) United States Patent
Pan

(10) Patent No.: US 10,788,636 B2
(45) Date of Patent: Sep. 29, 2020

(54) OPTICAL MODULE

(71) Applicant: Hisense Broadband Multimedia Technologies Co., Ltd., Qingdao, Shandong (CN)

(72) Inventor: Hongchao Pan, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 16/566,372

(22) Filed: Sep. 10, 2019

(65) Prior Publication Data

US 2020/0003977 A1 Jan. 2, 2020

Related U.S. Application Data

(63) Continuation of application No. PCT/CN2019/070898, filed on Jan. 8, 2019.

(30) Foreign Application Priority Data

Mar. 14, 2018 (CN) .......................... 2018 1 0209931

(51) Int. Cl.
*G02B 6/42* (2006.01)
*H01R 13/627* (2006.01)
*H04B 10/40* (2013.01)

(52) U.S. Cl.
CPC ......... *G02B 6/4261* (2013.01); *G02B 6/4284* (2013.01); *G02B 6/4292* (2013.01); *H01R 13/6275* (2013.01); *H04B 10/40* (2013.01)

(58) Field of Classification Search
None
See application file for complete search history.

(56) References Cited

U.S. PATENT DOCUMENTS 7,351,090 B1 * 4/2008 Moore ................. G02B 6/4246
439/372
2003/0194190 A1 * 10/2003 Huang ................. G02B 6/4201
385/92

(Continued)

FOREIGN PATENT DOCUMENTS

CN 201060288 Y 5/2008
CN 201740891 U 2/2011
(Continued)

OTHER PUBLICATIONS

State Intellectual Property Office of the People's Republic of China, Office Action and Search Report Issued in Application No. 201810209931.0, dated Apr. 1, 2019, 8 pages,(Submitted with Machine Translation).

(Continued)

*Primary Examiner* — Michael Stahl
(74) *Attorney, Agent, or Firm* — Hauptman Ham, LLP

(57) ABSTRACT

An optical module includes a base, an upper housing, an unlocker and a handle. The unlocker is rotatably connected to the base. The unlocker has a lock catch for locking the optical module. The handle is rotatably connected with the base by way of a first rotating portion. The unlocker is configured to be driven by the handle to rotate and cause the optical module to be in a locked state or an unlocked state. When the optical module is in the locked state, a first end of the handheld portion is further from a top surface of the upper housing than a second end of the handheld portion. A distance from the second end to a rotation axis of the first rotating portion is less than or equal to a distance from the first end to the rotation axis of the first rotating portion.

20 Claims, 3 Drawing Sheets

(56) References Cited

U.S. PATENT DOCUMENTS

| | | | |
|---|---|---|---|
| 2004/0228582 A1* | 11/2004 | Yamada | G02B 6/4292 |
| | | | 385/81 |
| 2005/0208821 A1* | 9/2005 | Ishigami | G02B 6/4201 |
| | | | 439/372 |
| 2006/0029332 A1* | 2/2006 | Chiu | G02B 6/3893 |
| | | | 385/53 |
| 2007/0149005 A1 | 6/2007 | Togami et al. | |
| 2010/0067199 A1* | 3/2010 | Chen | G02B 6/4201 |
| | | | 361/747 |
| 2011/0170832 A1* | 7/2011 | Yamai | G02B 6/4201 |
| | | | 385/92 |
| 2011/0206328 A1* | 8/2011 | Wang | G02B 6/4246 |
| | | | 385/94 |
| 2016/0131859 A1 | 5/2016 | Ishii et al. | |
| 2016/0218464 A1 | 7/2016 | Yang et al. | |
| 2016/0252691 A1* | 9/2016 | Arekar | G02B 6/4261 |
| | | | 385/92 |
| 2018/0275357 A1 | 9/2018 | Yizhi et al. | |

FOREIGN PATENT DOCUMENTS

| | | |
|---|---|---|
| CN | 103427909 A | 12/2013 |
| CN | 104516067 A | 4/2015 |
| CN | 104520743 A | 4/2015 |
| CN | 204441611 U | 7/2015 |
| CN | 106772831 A | 5/2017 |
| CN | 107102406 A | 8/2017 |
| CN | 107438782 A | 12/2017 |
| CN | 108387981 A | 8/2018 |
| EP | 3211468 A1 | 8/2017 |

OTHER PUBLICATIONS

ISA State Intellectual Property Office of the People's Republic of China, International Search Report Issued in Application No. PCT/CN2019/070898, dated Apr. 15, 2019, WIPO, 3 pages.

* cited by examiner

OPTICAL MODULE

CROSS-REFERENCE TO RELATED APPLICATIONS

The present application is a continuation of the International Patent Application No. PCT/CN2019/070898, filed on Jan. 8, 2019, which claims a priority to Chinese Patent Application No. 201810209931.0, entitled "OPTICAL MODULE," filed on Mar. 14, 2018, the entireties of which are incorporated herein.

TECHNICAL FIELD

The present disclosure relates to optical communication and in particular to an optical module.

BACKGROUND

With development of internet technology, large-scale data centers and cloud devices have emerged. Increased communication bandwidth is often needed to satisfy communication requirements of big data. Optical fiber communication is widely applied in network communication due to its good advantages in bandwidth and anti-interference ability.

SUMMARY

Some embodiments of the present disclosure are directed to an optical module comprising a base, an upper housing coupled with the base, an unlocker and a handle. The unlocker is in an accommodating space between the base and the upper housing and is rotatably connected to the base. The unlocker comprises a lock catch for locking the optical module. The handle includes a handheld portion and a cantilever. The handle is rotatably connected with the base by way of a first rotating portion. The handle drives the unlocker to rotate and cause the optical module to be in a locked state or an unlocked state. When the optical module is in the locked state, a first end of the handheld portion is further from a top surface of the upper housing than a second end of the handle portion from the top surface of the upper housing. A distance from the second end of the handle portion to a rotation axis of the first rotating portion is less than or equal to a distance from the first end of the handle portion to the rotation axis of the first rotating portion.

BRIEF DESCRIPTION OF THE DRAWINGS

To describe the technical solutions in embodiments of the present disclosure more clearly, drawings in descriptions of the embodiments of the present disclosure will be briefly introduced below. It is apparent that the drawings described below are merely some embodiments of the present disclosure and other drawings may be obtained by those of ordinary skill in the art based on these drawings without resorting to creative labor.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all the embodiments. Other embodiments achieved by those of ordinary skill in the art based on the embodiments in the present disclosure without paying creative labor shall all fall within the protective scope of the present disclosure.

In an optical fiber communication line, an optical module, i.e. a small form-factor pluggable photo/electric communication transceiver connector, is widely applied. The optical module includes a plug connector that is correspondingly connected with a plugging interface of a switch cage and has an unlocking mechanism so that quick plugging of the optical module and the switch cage is achieved.

Figure 1:
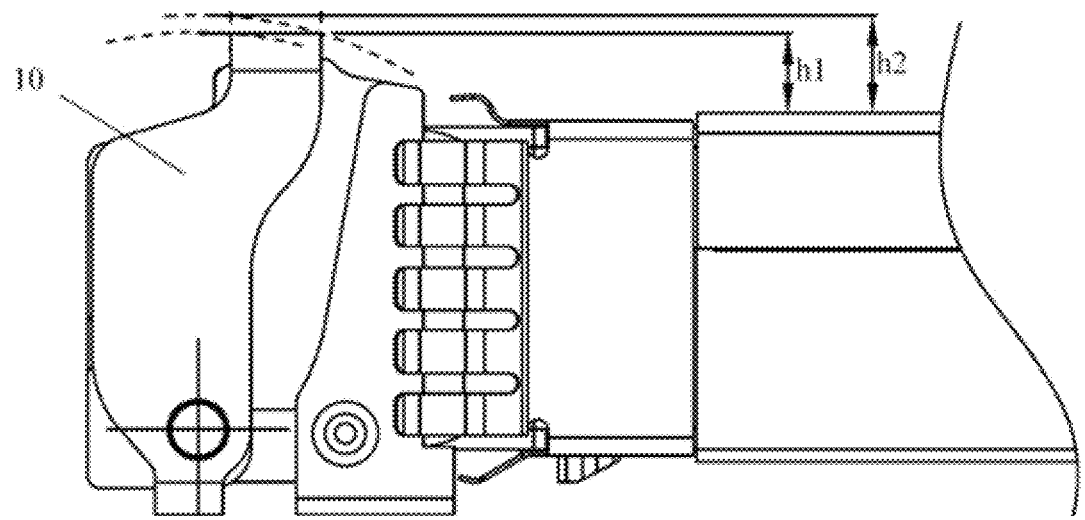
FIG. 1 is a diagram illustrating the structure of an optical module.

As shown in FIG. 1, the optical module drives the unlocking mechanism to move by rotating the handle 10 so that the optical module is unlocked from the switch cage or locked onto the switch cage. In a locked state, a distance from the highest point of the handle 10 to an upper shell surface of the optical module is $h1=1.96$ mm, which is in compliance with a standard height $h \leq 2.1$ mm specified in the optical module protocol SFF-8432. However, during a process of unlocking by rotation of the handle, a distance from the highest point of the handle 10 to the upper shell surface of the optical module is $h2=2.41$ mm, which is greater than the standard height h specified in the optical module protocol, sometimes results in a problem wherein the optical module cannot be unlocked and pulled out due to interference of the handle 10 and a system board of the switch cage during the unlocking process.

The optical module comprises a photo-electronic device, a functional circuit, an optical interface, or other suitable features. The photo-electronic device includes a transmitter and a receiver. The optical module realizes photoelectric conversion. The transmitter converts an electric signal into an optical signal, the optical signal is transmitted through an optical fiber and the receiver converts the optical signal into the electric signal again. According to a packaging type, the optical module may be divided into a Small Form-Factor Pluggable (SFP) optical module, a Small Form-factor Pluggable plus (SFP+) optical module and a Small Form Factor Pluggable Double Density (SFP-DD) optical module, or some other suitable format.

The optical module is pluggably mounted in the switch cage. Specifically, the optical module includes an unlocker. A lock catch of the unlocker is snap-connected with a lock hole provided on the switch cage to mount the optical module in the switch cage pluggably. According to plugging nature, the optical module is divided into a hot-pluggable optical module and a non-hot-pluggable optical module. Since it is not needed to turn off a switch host during a plugging process of the hot-pluggable optical module, the hot-pluggable optical module is widely applied in practical scenarios.

Figure 2:
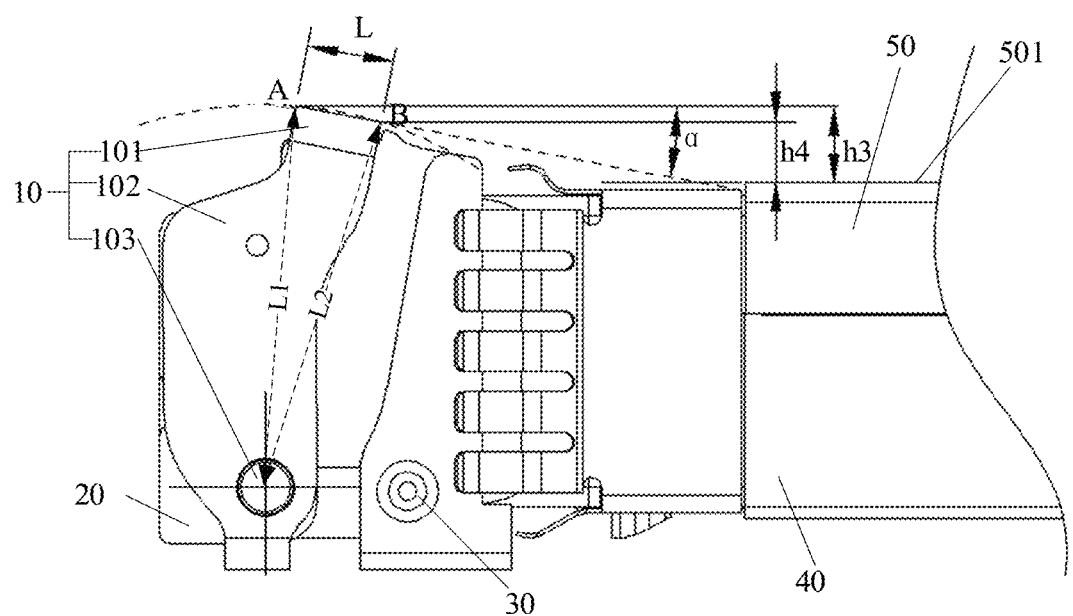
FIG. 2 is a schematic diagram illustrating the structure of an optical module according to some embodiments of the present disclosure.

FIG. 2 is a diagram of an optical module in accordance with some embodiments of the present disclosure. The optical module includes a base 40, an upper housing 50, an unlocker 20 and a handle 10. The unlocker 20 is in an accommodating space formed by connection of the base 40 and the upper housing 50 and is rotatably connected to the base 40. The unlocker 20 includes a lock catch 203 for locking the optical module.

In some embodiments of the present disclosure, the base 40 and the upper housing 50 are connected to form a body structure of the optical module. Specifically, the base 40 and the upper housing 50 is of a half shell structure. After the base 40 is connected with the upper housing 50, the accommodating space for the unlocker 20 is formed. The body structure is pluggably mounted in a switch cage. The unlocker 20 has the lock catch 203, and the unlocker 20 is located in the accommodating space and is connected rotatably with the base 40.

The handle 10 includes a handheld portion 101 and cantilevers 102 connected with the handheld portion 101. The cantilever 102 comprises a first rotating portion 103 and a driving hole 105. The handle 10 is rotatably connected with the base 40 by way of the first rotating portion 103 and a driving shaft 201 on the unlocker 20 is sleeved into the driving hole 105. When the handheld portion 101 rotates around the first rotating portion 103, the driving hole 105 drives the lock catch 203 to rotate in the base 40 by way of the driving shaft 201 so that locking or unlocking of the optical module is achieved.

Figure 5:
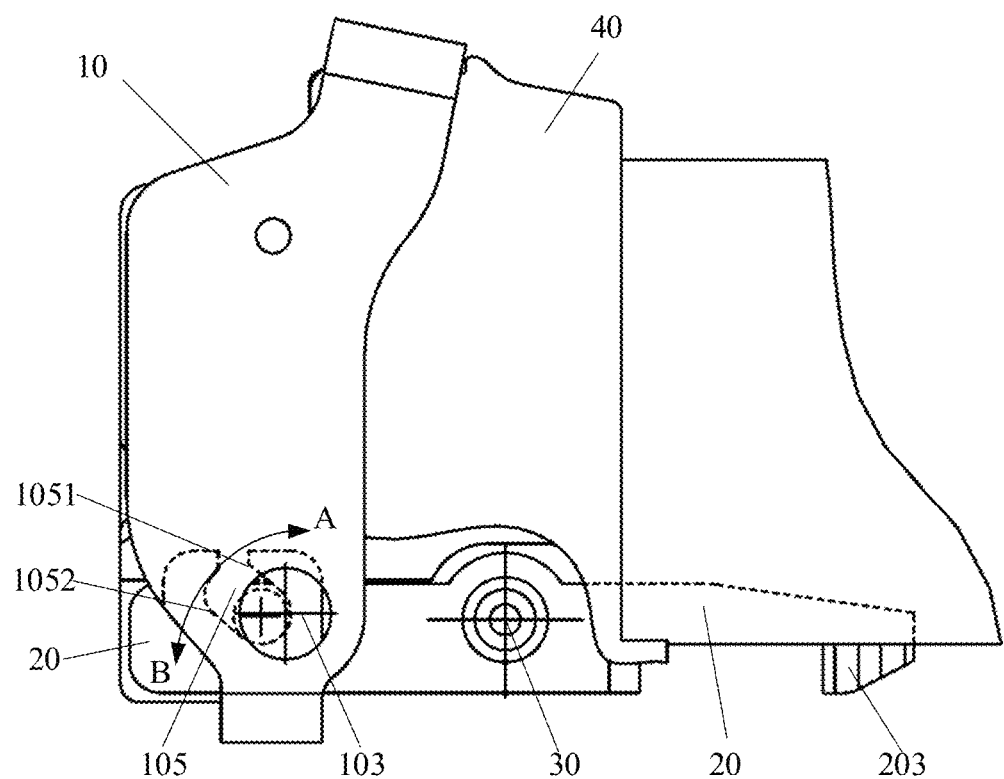
FIG. 5 is a schematic diagram illustrating the structure of an optical module in a locked state according to some embodiments of the present disclosure.
Figure 6:
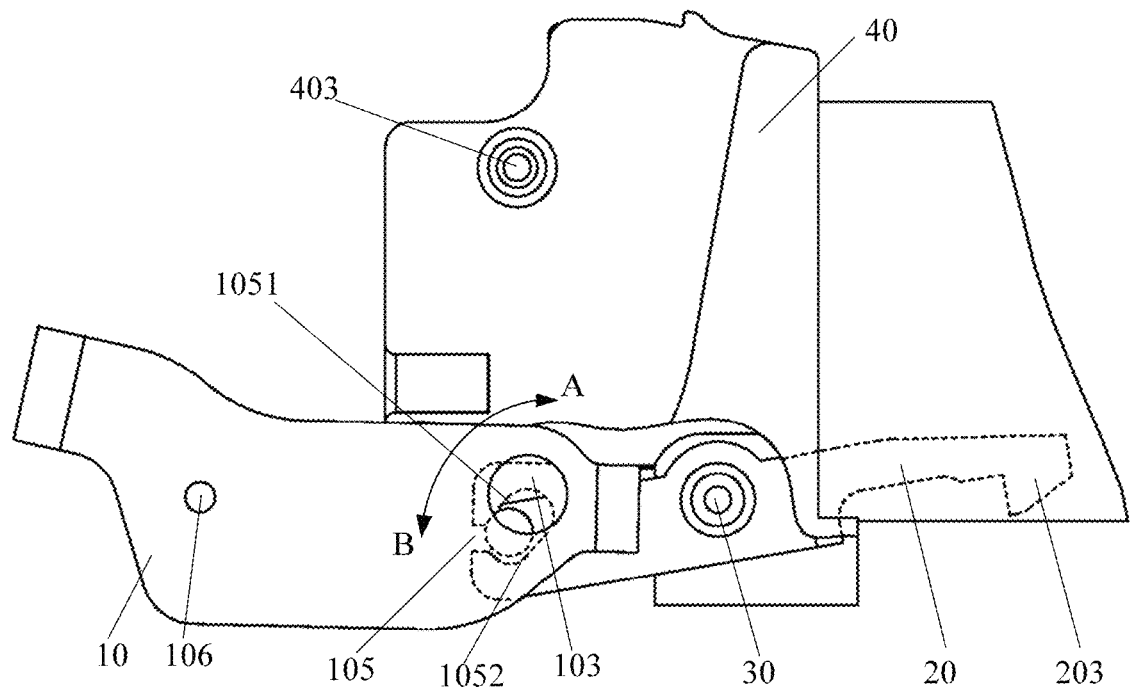
FIG. 6 is a schematic diagram illustrating the structure of an optical module in an unlocked state according to some embodiments of the present disclosure.

As shown in FIG. 5 and FIG. 6, when the optical module is locked, the handle 10 rotates along a direction A. When the handle 10 rotates, the driving hole 105 on the cantilever 102 drives the lock catch 203 on the unlocker 20 to rotate clockwise in a body so that the lock catch 203 is exposed outside the base 40 and is snap-fitted in the switch cage, thereby realizing the locking of the optical module. When the optical module is unlocked, the handle 10 rotates along a direction B. When the handle 10 rotates, the driving hole 105 on the cantilever 102 drives the lock catch 203 on the unlocker 20 to rotate counterclockwise in the body so that the lock catch 203 rotates into the base 40, thereby realizing the unlocking of the optical module. The optical module is taken out of the switch cage.

The handle 10 is a component for locking or unlocking when the optical module and the switch cage are connected. The handle 10 is formed by processes such as sheet metal stamping, bending and so on, so that the handheld portion 101 is of a flat plate-shaped structure.

The base 40 is a body component of the optical module used to fix a circuit board and is inserted into the switch cage. According to regulations of SFF-8432, the switch cage is a standard component and thus a distance from the handheld portion 101 to a top surface 501 of the upper housing 50 connected with the base 40 is h≤2.1 mm. It is noted that the top surface 501 refers to a surface of the upper housing 50 facing the handheld portion 101.

As shown in FIG. 2, Specifically in some embodiments of the present disclosure, the handle 10 may rotate around the first rotating portion 103. In a locked state shown in FIG. 2, a first end A of the handheld portion 101 is further from the top surface 501 of the upper housing 50 than a second end B of the handheld portion 101 from the top surface 501 of the upper housing 50. The first end A is an end at the upper left side of the handheld portion 101 and the second end B is an end at the upper right side of the handheld portion 101. The handheld portion 101 has a certain angle α relative to a horizontal plane. The angle ranges between 0-14 degrees so that the distances from the first end A and the second end B on the handheld portion 101 to the top surface 501 of the upper housing 50 are not equal. For example, a distance from the first end A of the handheld portion 101 to the top surface 501 of the upper housing 50 is h3, and h3 is within the distance specified in SFF-8432, for example, h3 is equal to 1.96 mm (less than 2.1 mm), and a distance from the second end B to the top surface 501 of the upper housing 50 is h4 which is less than h3. That is, the first end A is higher than the second end B in a vertical direction. Further, a distance L2 from the second end B to a rotation axis of the first rotating portion 103 is less than or equal to a distance L1 from the first end A to the rotation axis of the first rotating portion 103. During a process of unlocking by rotation of the handle 10, when the handheld portion 101 rotates around the first rotating portion 103, since the distance L2 from the second end B to the rotation axis of the first rotating portion 103 is less than or equal to the distance L1 from the first end A to the rotation axis of the first rotating portion 103, the second end B remains on or within an arc formed with the first rotating portion 103 as a center and L1 as a radius. That is, the distance h4 from the second end B to the top surface 501 of the upper housing 50 is always less than or equal to h3 during a rotation process of the handheld portion 101. Namely, h4 is always within the distance specified by the SFF-8432 protocol. Thus, no interference between the handheld portion 101 and the system board of the switch cage will occur, avoiding a problem that unlocking cannot be achieved due to interference of the handheld portion 101 and the switch cage resulting from the distance h2 from a right end of the handheld portion 101 to the top surface 501 of the upper housing 50 being greater than the distance specified by the SFF-8432 protocol during an unlocking process of the handle 10 shown in FIG. 1. Thus, the optical module is smoothly unlocked and pulled out, thereby improving reliability of the optical module product.

In some embodiments, the distance h4 from the second end B to the top surface 501 of the upper housing 50 is less than 2.1 mm. That is, h4 is within the distance specified by SFF-8432, and h3 is less than h4. That is, the first end A is lower than the second end B in the vertical direction. Further, the distance L1 from the first end A to the rotation axis of the first rotating portion 103 is less than or equal to the distance L2 from the second end B to the rotation axis of the first rotating portion 103.

As shown in FIG. 2, in some embodiments of the present disclosure, a distance L from the first end A to the second end B is at least 2.2 mm to ensure structural strength of the handheld portion 101, and maximum values of the distance L2 from the second end B to the rotation axis of the first rotating portion 103 and the distance L1 from the first end A to the rotation axis of the first rotating portion 103 is 10 mm to avoid interference of the handheld portion 101 and the switch cage.

Of course, those skilled in the art may set the distance L between the first end A and the second end B according to the material of the handle 10. The embodiments of the present disclosure are not limited hereinto.

Figure 3:
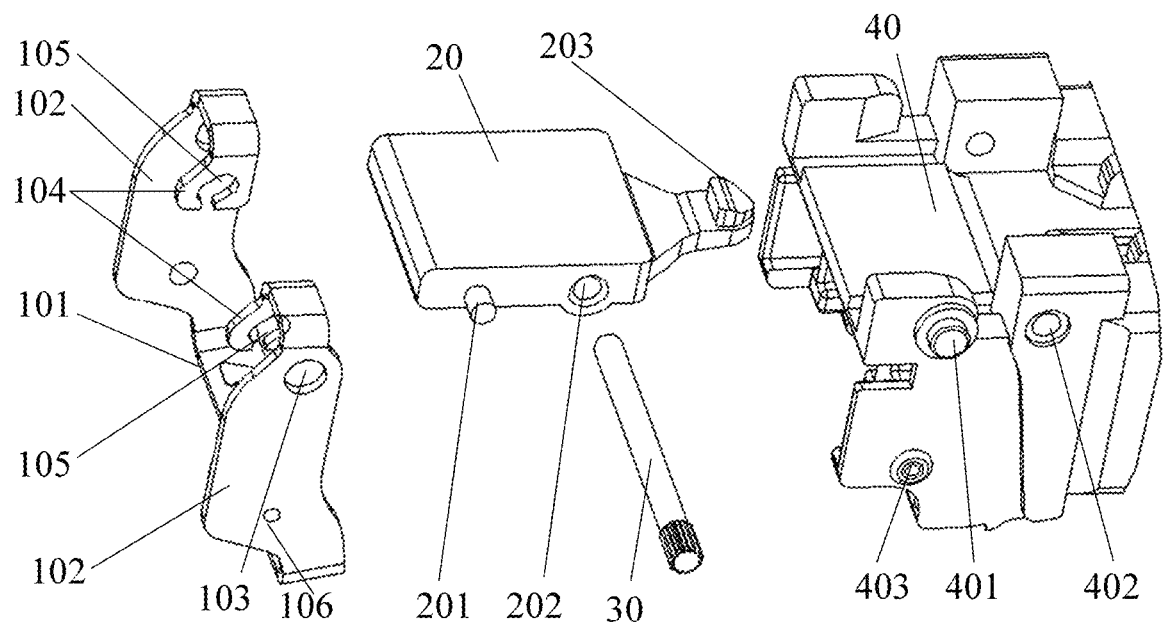
FIG. 3 is an exploded, schematic diagram illustrating the structure of an optical module according to some embodiments of the present disclosure.

FIG. 3 is an exploded, schematic diagram illustrating the structure of the optical module according to some embodiments of the present disclosure. The base 40 of some embodiments of the present disclosure includes a first rotating shaft 401, the first rotating portion 103 on the cantilever 102 of the handle 10 is a first rotating shaft hole, the handle 10 is rotatably connected with the base 40 by way of a mating between the first rotating shaft hole and the first rotating shaft 401, and the rotation axis of the first rotating portion 103 is a central axis of the first rotating shaft hole. Specifically, the handle 10 and the base 40 are rotatably connected by way of cooperation of the shaft and the hole. Of course, in a practical application scenario, the rotating shaft may be on the handle and the rotating shaft hole may be arranged on the base. The embodiments of the present disclosure are not limited on how the rotating shaft and the rotating shaft hole are arranged on the base or the handle.

As shown in FIG. 3, one end of the unlocker 20 comprises the lock catch 203 and the other end is movably connected with the cantilever 102. The unlocker 20 is located inside the base 40 and is rotatably connected with the base 40. The optical module further includes a second rotating shaft 30, and the unlocker 20 is of a plate-shaped structure. The unlocker 20 has a second rotating shaft hole 202 and the base 40 includes a fixing hole 402. The second rotating shaft hole 202 is connected with the fixing hole 402 by way of the second rotating shaft 30 so that the unlocker 20 is rotatably connected to the base 40. Specifically, the second rotating shaft hole 202 and the fixing hole 402 share the same shaft. The second rotating shaft 30 passes through the fixing hole 402 and the second rotating shaft hole 202 and then is fixedly connected with the fixing hole 402 of the base 40, so that the unlocker 20 may rotate around the second rotating shaft 30. When unlocked, the lock catch 203 on one end of the unlocker 20 may be disengaged from the lock hole provided on the switch cage to realize unlocking. When locked, the lock catch 203 is located in the lock hole of the switch cage to realize locking.

In some embodiments, the second rotating shaft 30 is a rivet which is fixedly riveted with the fixing hole 402. The second rotating shaft 30 is a bolt which is fixedly connected with the fixing hole 402 through threads.

Figure 4:
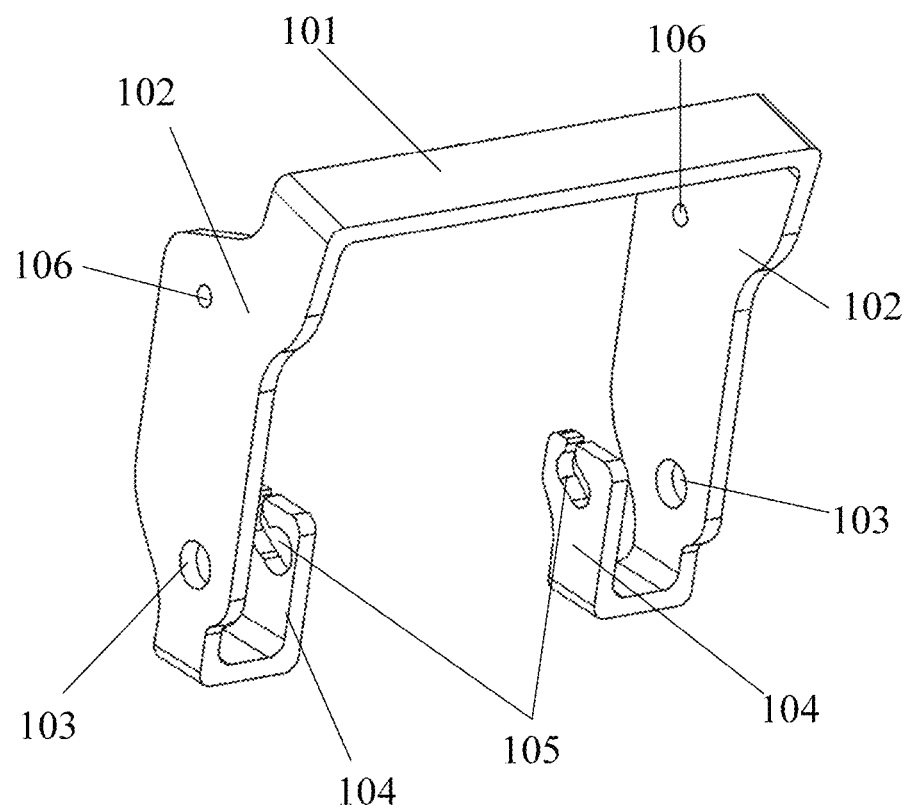
FIG. 4 is a schematic diagram illustrating the structure of a handle according to some embodiments of the present disclosure.

As shown in FIG. 3 and FIG. 4, one end of the unlocker 20 movably connected with the cantilever 102 has a driving shaft 201, bending arms 104 connected with the cantilevers 102 are disposed between the cantilevers 102, driving holes 105 are disposed on the bending arms 104 and the driving shaft 201 sleeved into the driving holes 105 may move in the driving holes 105. Specifically, the handle 10 is of a sheet metal structure, the cantilever 102 is connected with one bending arm 104 through one bend and the driving hole 105 is punched out on the bending arm 104.

As shown in FIG. 5 and FIG. 6, the driving hole 105 includes an unlocking driving surface 1051 and a locking driving surface 1052. The unlocking driving surface 1051 and the locking driving surface 1052 are arranged in opposite direction. When the optical module is unlocked, the driving shaft 201 abuts against the unlocking driving surface 1051, and the unlocker 20 is driven by the handle 10 to rotate so that the lock catch 203 moves along a direction toward the inside of the base 40. When the optical module is locked, the driving shaft 201 abuts against the locking driving surface 1052, and the unlocker 20 is driven by the handle 10 to rotate so that the lock catch 203 moves along a direction away from the inside of the base 40.

Hereinafter, descriptions are made to a process of unlocking and locking the optical module in combination with FIG. 5 and FIG. 6.

As shown in FIG. 6, when the optical module is in an unlocked state, the handle 10 rotates counterclockwise around the rotation axis of the first rotating portion 103 and the unlocking driving surface 1051 of the driving hole 105 presses the driving shaft 201 of the unlocker 20 from a direction A to a direction B during a rotation process of the handle 10, so that the driving shaft 201 of the unlocker 20 is driven to slide in the driving holes 105. The unlocker 20 rotates counterclockwise around the second rotating shaft 30 and the lock catch 203 rotates into the base 40 to disengage from the lock hole of the switch cage, thereby realizing unlocking of the optical module.

As shown in FIG. 5 and FIG. 6, when locking, the handle 10 rotates clockwise around the rotation axis of the first rotating portion 103, and the locking driving surface 1052 of the driving hole 105 presses the driving shaft 201 of the unlocker 20 from the direction B to the direction A during a rotation process of the handle 10, so that the driving shaft 201 of the unlocker 20 is driven to slide in the driving holes 105. The unlocker 20 rotates clockwise around the second rotating shaft 30 and the lock catch 203 is exposed outside the base 40 and located in the lock hole of the switch cage, thereby realizing locking of the optical module.

As shown in FIG. 6, in some embodiments of the present disclosure, the cantilever 102 includes a damping hole 106 and a surface of the base 40 opposite to the cantilever 102 includes a damping block 403 mating with the damping hole 106. Specifically, the base 40 is a sheet metal and the damping block 403 is formed by punching on the base 40. When the handle 10 is locked, the damping block 403 is mated with the damping hole 106, thereby increasing damping between the handle 10 and the base 40. In this way, there will be a lag feel after the handle 10 is locked in position and the handle 10 will not be unlocked automatically. At the same time, a hand feel of a user during the process of locking and unlocking will be increased to remind the user that the handle 10 is locked in position or unlocked.

In the embodiments of the present disclosure, in a locked state, a first end of the handheld portion of the handle is further from the top surface 501 of the upper housing than the second end of the handheld portion from the top surface 501 of the upper housing, and the distance from the second end to the first rotating portion is less than or equal to the distance from the first end to the first rotating portion, so that the distances from the first end and the second end to the top surface 501 of the upper housing are always within the distance specified in the protocol during a process of unlocking by rotation of the handle around the first rotating portion, thereby avoiding the problem that the unlocking cannot be achieved due to interference of the handheld portion and the switch cage resulting from the distance from the handheld portion to the top surface 501 of the upper housing being greater than the distance specified in SFF-8432 during the process of unlocking. Thus, the optical module can be smoothly unlocked and pulled out, thereby improving reliability of the optical module product.

The handle and the unlocker of the unlocking structure of the optical module in the embodiments of the present disclosure are both of rigid structure, thereby avoiding a problem of complex structure and low reliability caused by locking and unlocking with elastic components such as springs, elastic sheets and so on, and simplifying the unlocking structure. Also, the reliability of unlocking and locking is improved by directly driving the unlocker to unlock with the handle.

In the descriptions of the present specification, terms such as "an example", "some examples", "illustrative examples", "embodiments", "a specific example" or "some examples" are intended to refer to that a specific feature, structure, material, or characteristic described in combination with an embodiment or an example are included in at least one embodiment or example of the present disclosure. In the present specification, the illustrative expressions of the above terms do not necessarily refer to a same embodiment or example. Further, specific feature, structure, material or characteristic described above may be combined in a proper way in one or more embodiments or examples.

The foregoing disclosure is merely illustrative of examples of the present disclosure but not intended to limit the present disclosure, and any modifications, equivalent substitutions, adaptations thereof made within the spirit and principles of the disclosure shall fall within the scope of the present disclosure.

The invention claimed is:

1. An optical module, comprising:
   a base;
   an upper housing coupled with the base;
   an unlocker in an accommodating space between the base and the upper housing, the unlocker comprising a lock catch for locking the optical module; and
   a handle comprising a handheld portion and a cantilever, wherein the handle is rotatably connected with the base by way of a first rotating portion, and the unlocker is configured to be operatively driven by the handle to rotate and cause the optical module to be in a locked state or an unlocked state;
   wherein when the optical module is in the locked state, the handheld portion forms an angle relative to a horizontal plane, and a first end of the handheld portion is further from a top surface of the upper housing than a second end of the handheld portion from the top surface of the upper housing, and a distance from the second end of the handheld portion to a rotation axis of the first rotating portion is less than or equal to a distance from the first end of the handheld portion to the rotation axis of the first rotating portion, wherein the first end and the second end are end points of intersection between the handheld portion and a same cantilever.

2. The optical module according to claim 1, wherein the distance from the first end of the handheld portion to the rotation axis of the first rotating portion is less than or equal to 10 mm.

3. The optical module according to claim 1, wherein the unlocker further comprises a driving shaft sleeved into a driving hole in the cantilever,
   the first rotating portion is at an end of the cantilever, and
   when the handheld portion rotates around the first rotating portion, the driving hole facilitates locking or unlocking of the optical module by driving the lock catch to rotate in the base with the driving shaft.

4. The optical module according to claim 3, further comprising:
   a bending arm on the cantilever,
   wherein the driving hole is in the bending arm and the driving shaft sleeved into the driving hole is configured to be movable in the driving hole.

5. The optical module according to claim 3, wherein
   the driving hole comprises an unlocking driving surface and a locking driving surface, and
   when the optical module is in the unlocked state, the driving shaft abuts against the unlocking driving surface and the unlocker is configured to be driven by the handle to rotate so that the lock catch moves along a direction toward the inside of the base.

6. The optical module according to claim 5, wherein when the optical module is in the locked state, the driving shaft abuts against the locking driving surface and the unlocker is configured to be driven by the handle to rotate so that the lock catch moves along a direction away from the inside of the base.

7. The optical module according to claim 1, wherein
   the first rotating portion is a first rotating shaft hole in the handle,
   the base has a first rotating shaft,
   the handle is rotatably connected with the base by way of a mating between the first rotating shaft hole and the first rotating shaft, and
   the rotation axis of the first rotating portion is a central axis of the first rotating shaft hole.

8. The optical module according to claim 7, further comprising:
   a second rotating shaft,
   wherein the unlocker has a second rotating shaft hole,
   the base has a fixing hole, and
   the second rotating shaft hole is connected with the fixing hole by way of the second rotating shaft so that the unlocker is rotatably connected to the base.

9. The optical module according to claim 1, wherein the cantilever has a damping hole, and
   a surface of the base opposite to the cantilever has a damping block, wherein the damping block is configured to be snapped into the damping hole when the optical module is in the locked state.

10. The optical module according to claim 1, wherein the optical module is one of a Small Form-Factor Pluggable SFP optical module, a SFP+ optical module, or a Small Form Factor Pluggable Double Density SFP-DD optical module.

11. The optical module according to claim 1, further comprising:
    a rotating shaft,
    wherein the unlocker has a rotating shaft hole,
    the base has a fixing hole, and
    the rotating shaft hole is connected with the fixing hole by way of the rotating shaft so that the unlocker is rotatably connected to the base.

12. The optical module according to claim 1, the angle ranges between 0-14 degrees.

13. An optical module, comprising:
    a base;
    an upper housing coupled with the base;
    an unlocker in an accommodating space between the base and the upper housing, the unlocker comprising a lock catch for locking the optical module; and
    a handle comprising a handheld portion and a cantilever, wherein the handheld portion is of a plate-shaped structure, the handle is rotatably connected with the base by way of a first rotating portion, and the unlocker is configured to be operatively driven by the handle to rotate and cause the optical module to be in a locked state or an unlocked state;
    wherein when the optical module is in the locked state, the handheld portion forms an angle relative to a horizontal plane, and a first end of the handheld portion is further from a top surface of the upper housing than a second end of the handheld portion from the top surface of the upper housing, and a distance from the second end of the handheld portion to a rotation axis of the first rotating portion is less than or equal to a distance from the first end of the handheld portion to the rotation axis of the first rotating portion.

14. The optical module according to claim 13, wherein the distance from the first end of the handheld portion to the rotation axis of the first rotating portion is less than or equal to 10 mm.

15. The optical module according to claim 13, wherein
the first rotating portion is a first rotating shaft hole in the handle,
the base has a first rotating shaft,
the handle is rotatably connected with the base by way of a mating between the first rotating shaft hole and the first rotating shaft, and
the rotation axis of the first rotating portion is a central axis of the first rotating shaft hole.

16. The optical module according to claim 15, further comprising:
a second rotating shaft,
wherein the unlocker has a second rotating shaft hole,
the base has a fixing hole, and
the second rotating shaft hole is connected with the fixing hole by way of the second rotating shaft so that the unlocker is rotatably connected to the base.

17. The optical module according to claim 13, further comprising:
a rotating shaft,
wherein the unlocker has a rotating shaft hole,
the base has a fixing hole, and
the rotating shaft hole is connected with the fixing hole by way of the rotating shaft so that the unlocker is rotatably connected to the base.

18. The optical module according to claim 13, wherein the cantilever has a damping hole, and
a surface of the base opposite to the cantilever has a damping block, wherein the damping block is configured to be snapped into the damping hole when the optical module is in the locked state.

19. The optical module according to claim 13, wherein
the unlocker further comprises a driving shaft sleeved into a driving hole in the cantilever,
the first rotating portion is at an end of the cantilever, and
when the handheld portion rotates around the first rotating portion, the driving hole facilitates locking or unlocking of the optical module by driving the lock catch to rotate in the base with the driving shaft.

20. The optical module according to claim 13, wherein the angle ranges between 0-14 degrees.

* * * * *